J. A. MANNING.
Vehicle-Axle.

No. 219,962. Patented Sept. 23, 1879.

WITNESSES:
Henry N. Miller
C. Sedgwick

INVENTOR:
J. A. Manning
BY Munn & Co
ATTORNEYS.

UNITED STATES PATENT OFFICE.

JAMES A. MANNING, OF DANVILLE, INDIANA.

IMPROVEMENT IN VEHICLE-AXLES.

Specification forming part of Letters Patent No. 219,962, dated September 23, 1879; application filed February 5, 1879.

*To all whom it may concern:*

Be it known that I, JAMES A. MANNING, of Danville, in the county of Hendricks and State of Indiana, have invented a new and useful Improvement in Axle-Journals, of which the following is a specification.

My invention relates to an improved construction of carriage-axle journals; and it consists in a journal in which the inner and outer portions of the bearing parts are tapered and the outer tapering portion of the journal—i. e., the nut—is adjusted toward the inner tapering portion of the axle, so as to take up the wear of the double-tapering box, and in which the tapering and adjustable parts of the bearing are provided with recesses or cavities for retaining oil or lubricant, whereby the tendency of the lubricant to escape from these inclined parts to the center is avoided, and whereby these parts, which have an increased superficial area of friction, are provided with a correspondingly-increased amount of lubricating material, thus rendering practical the employment of the double-tapering journal, which affords the best means of adjusting the parts for wear.

Figure 1:
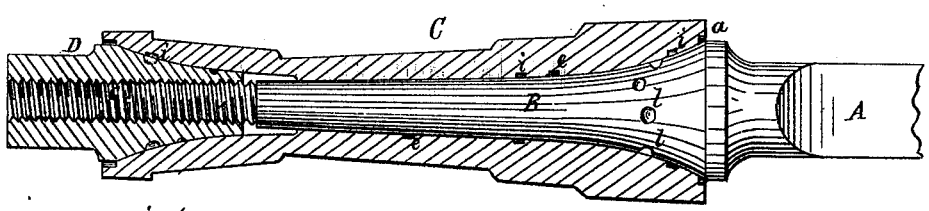
Figure 2:
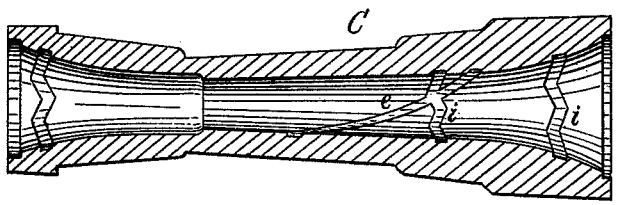

In the accompanying drawings, Figure 1 is a longitudinal section of an axle box and journal constructed in accordance with my invention. Fig. 2 is a similar section of the axle-box detached.

Similar letters of reference indicate corresponding parts.

A is the axle or spindle, B the journal, and C the box. The journal B is enlarged at its inner end to render it tapering or conical in form, and box C is of corresponding shape. A collar, *a*, upon the journal fits into an annular recess in the inner end of box C, and prevents access of dust to the bearing-surfaces.

The outer end of B is threaded to receive the conical nut D, which retains box C in place by its conical surface taking against the flaring or conical interior surface of box C.

This construction permits the box to be clamped between the nut D and the enlarged inner end of the journal, so that there can be no end movement of the box on the journal, and wear may be compensated by screwing up nut D.

The conical enlargement of the box extends inward beyond the screw-thread of the journal, thus leaving space for screwing up nut D.

Figure 3:

The outer end of nut D is squared for the application of a wrench in setting or removing the nut, and it is prevented from working inward and binding the box by a set-screw, *c*, (shown separately in Fig. 3,) which is adapted for screwing into the threaded hole of nut D up against the end of journal B. The screw *c* is slotted on its ends for the application of a screw-driver.

The inner surface of box C is provided with spiral grooves *e*, that act to retard the flow of oil from the base of the conical journal to the outer end. There are also annular grooves *i*, of zigzag form, that retain the oil when the box is not in motion. The zigzag shape tends to distribute the oil upon the surface of the journal when the box is turning.

The direction of the spiral groove *e* will be determined according as the wheel is right or left hand, the groove being intended to carry the oil inward toward the base of the journal. I also provide cavities *l* in the surface of journal B, that retain oil.

In defining my invention more clearly, I would state that I do not claim, broadly, an axle-journal having tapering bearings at the inner and outer edges of the journal, as this has been heretofore used. This form of journal, while it possesses advantages in respect to the adjustment of the outer part to the inner part to take up wear, is objectionable in that the lubricant has a tendency to flow to the center and leave the outer parts dry, which objection is further increased by the more extended superficial area of these points.

In obviating these objections in an adjustable double-tapering journal I locate oil cavities or recesses at the inclined, enlarged, or tapering portion of the bearings to the exclusion of the central parts of the journal. I thus retain oil upon the enlarged portion of the journal, and render practical a desirable form of adjustable axle-journal.

Without claiming, then, either the double taper of the journal or the oil-cavities, separately considered—

What I consider new, and desire to secure by Letters Patent, is—

The double-tapering axle-journal, having its outer portion, D, adjustable, and provided with a stop-screw plug, c, in combination with the double-tapering box C, the inclined or tapering bearing parts being provided with oil-retaining cavities or recesses, substantially as shown and described.

JAMES ALONZO MANNING.

Witnesses:
 THOS. N. JONES,
 B. N. BEAL.